United States Patent
Yang et al.

(10) Patent No.: US 12,131,505 B2
(45) Date of Patent: Oct. 29, 2024

(54) METHOD, ELECTRONIC DEVICE, AND PROGRAM PRODUCT FOR TRAINING ENCODER AND PROCESSING DATA

(71) Applicant: Dell Products L.P., Round Rock, TX (US)

(72) Inventors: Wenbin Yang, Shanghai (CN); Zijia Wang, WeiFang (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 442 days.

(21) Appl. No.: 17/740,584

(22) Filed: May 10, 2022

(65) Prior Publication Data

US 2023/0342979 A1     Oct. 26, 2023

(30) Foreign Application Priority Data

Apr. 22, 2022   (CN) .......................... 202210432066.2

(51) Int. Cl.
G06T 9/00 (2006.01)
G06F 18/21 (2023.01)

(52) U.S. Cl.
CPC .............. *G06T 9/00* (2013.01); *G06F 18/217* (2023.01)

(58) Field of Classification Search
CPC ................................ G06T 9/00; G06F 18/217
See application file for complete search history.

(56) References Cited

U.S. PATENT DOCUMENTS

| | | | |
|---|---|---|---|
| 2016/0188996 A1* | 6/2016 | Modica .................. | G06F 16/50 382/203 |
| 2018/0122137 A1* | 5/2018 | Tian ........................ | G06T 17/00 |
| 2021/0118132 A1* | 4/2021 | Kearney ................. | A61C 7/002 |
| 2022/0084221 A1* | 3/2022 | Deng ...................... | G06V 10/7715 |
| 2022/0245775 A1* | 8/2022 | Wang ..................... | G06N 3/045 |

(Continued)

OTHER PUBLICATIONS

C. R. Qi et al., "PointNet: Deep Learning on Point Sets for 3D Classification and Segmentation," arXiv:1612.00593v2, Apr. 10, 2017, 19 pages.

(Continued)

*Primary Examiner* — Edward Park
(74) *Attorney, Agent, or Firm* — Ryan, Mason & Lewis, LLP

(57) ABSTRACT

Embodiments relate to a method, an electronic device, and a program product for training an encoder and processing data. The method includes inputting sample point cloud data for an object to an encoder to obtain encoded data for the object, and determining, by transforming the encoded data, a plurality of invariant portions for the object and a plurality of variable portions for the object, an invariant portion in the plurality of invariant portions indicating an invariant feature of the object and a variable portion in the plurality of variable portions indicating a variable feature of the object. The method further includes determining, based on the plurality of invariant portions and the plurality of variable portions, a similarity loss and a spatial loss for the sample point cloud data, and adjusting, based on the similarity loss and the spatial loss, a parameter of the encoder to obtain a trained encoder.

20 Claims, 5 Drawing Sheets

(56) References Cited

U.S. PATENT DOCUMENTS

2023/0342979 A1* 10/2023 Yang .................. G06V 10/82

OTHER PUBLICATIONS

N. Guan et al., "MahNMF: Manhattan Non-negative Matrix Factorization," Journal of Machine Learning Research, Jul. 2012, 42 pages.
Z. Geng et al., "Is Attention Better than Batrix Decomposition?" arXiv:2109.04553v2, Dec. 28, 2021, 24 pages.
G. Gafni et al., "Dynamic Neural Radiance Fields for Monocular 4D Facial Avatar Reconstruction," arXiv:2012.03065v1, Dec. 5, 2020, 11 pages.
W. Sun et al., "Canonical Capsules: Self-Supervised Capsules in Canonical Pose," 35th Conference on Neural Information Processing Systems, Dec. 2021, 17 pages.
T. Deprelle et al., "Learning Elementary Structures for 3D Shape Generation and Matching," arXiv:1908.04725v2, Aug. 14, 2019, 11 pages.
Y. Zhao et al., "3D Point Capsule Networks," arXiv:1812.10775v2, Jul. 11, 2019, 14 pages.

* cited by examiner

METHOD, ELECTRONIC DEVICE, AND PROGRAM PRODUCT FOR TRAINING ENCODER AND PROCESSING DATA

RELATED APPLICATION(S)

The present application claims priority to Chinese Patent Application No. 202210432066.2, filed Apr. 22, 2022, and entitled "Method, Electronic Device, and Program Product for Training Encoder and Processing Data," which is incorporated by reference herein in its entirety.

FIELD

Embodiments of the present disclosure relate to the field of data processing, and more particularly, to a method, an electronic device, and a program product for training an encoder and processing data.

BACKGROUND

With the development of computer technologies, people have begun to use computer vision technologies to obtain information about a target object or an environment. Generally, in this process, point cloud data for an object may be captured by various devices, and the captured point cloud data may then be analyzed to obtain various desired information. In accordance with conventional practice, most of the available features for point clouds are produced manually for specific tasks. Point cloud features usually encode certain statistical attributes of a point. However, there are still many problems that need to be solved in the analysis and processing of point cloud data.

SUMMARY

A method, an electronic device, and a program product for training an encoder and processing data are provided in embodiments of the present disclosure.

According to a first aspect of the present disclosure, a method for training an encoder is provided. The method includes: inputting sample point cloud data for an object to an encoder to obtain encoded data for the object. The method includes: determining, by transforming the encoded data, a plurality of invariant portions for the object and a plurality of variable portions for the object, an invariant portion in the plurality of invariant portions indicating an invariant feature of the object and a variable portion in the plurality of variable portions indicating a variable feature of the object. The method further includes: determining, based on the plurality of invariant portions and the plurality of variable portions, a similarity loss and a spatial loss for the sample point cloud data. The method further includes: adjusting, based on the similarity loss and the spatial loss, a parameter of the encoder to obtain a trained encoder.

According to a second aspect of the present disclosure, a method for processing data is provided. The method includes: inputting point cloud data for an object to a trained encoder to obtain encoded data for the object, the trained encoder being obtained by adjusting a parameter of an encoder based on a similarity loss and a spatial loss obtained for sample point cloud data for a sample object. The method further includes: determining, by transforming the encoded data, an invariant portion for the object and a variable portion for the object, the invariant portion indicating an invariant feature of the object and the variable portion indicating a variable feature of the object.

According to a third aspect of the present disclosure, an electronic device is provided. The electronic device includes at least one processor; a memory coupled to the at least one processor and having instructions stored thereon, wherein the instructions, when executed by the at least one processor, cause the device to perform actions including: inputting sample point cloud data for an object to an encoder to obtain encoded data for the object; determining, by transforming the encoded data, a plurality of invariant portions for the object and a plurality of variable portions for the object, an invariant portion in the plurality of invariant portions indicating an invariant feature of the object and a variable portion in the plurality of variable portions indicating a variable feature of the object; and determining, based on the plurality of invariant portions and the plurality of variable portions, a similarity loss and a spatial loss for the sample point cloud data; and adjusting, based on the similarity loss and the spatial loss, a parameter of the encoder to obtain a trained encoder.

According to a fourth aspect of the present disclosure, an electronic device is provided. The electronic device includes at least one processor; a memory coupled to the at least one processor and having instructions stored thereon, wherein the instructions, when executed by the at least one processor, cause the device to perform actions including: inputting point cloud data for an object to a trained encoder to obtain encoded data for the object, the trained encoder being obtained by adjusting a parameter of an encoder based on a similarity loss and a spatial loss obtained for sample point cloud data for a sample object; and determining, by transforming the encoded data, an invariant portion for the object and a variable portion for the object, the invariant portion indicating an invariant feature of the object and the variable portion indicating a variable feature of the object.

According to a fifth aspect of the present disclosure, a computer program product is provided, which is tangibly stored on a non-transitory computer-readable medium and includes machine-executable instructions, wherein the machine-executable instructions, when executed by a machine, cause the machine to perform the steps of the methods in at least one of the first and second aspects of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

In the figures, identical or corresponding numerals represent identical or corresponding parts.

DETAILED DESCRIPTION

Figure 1:
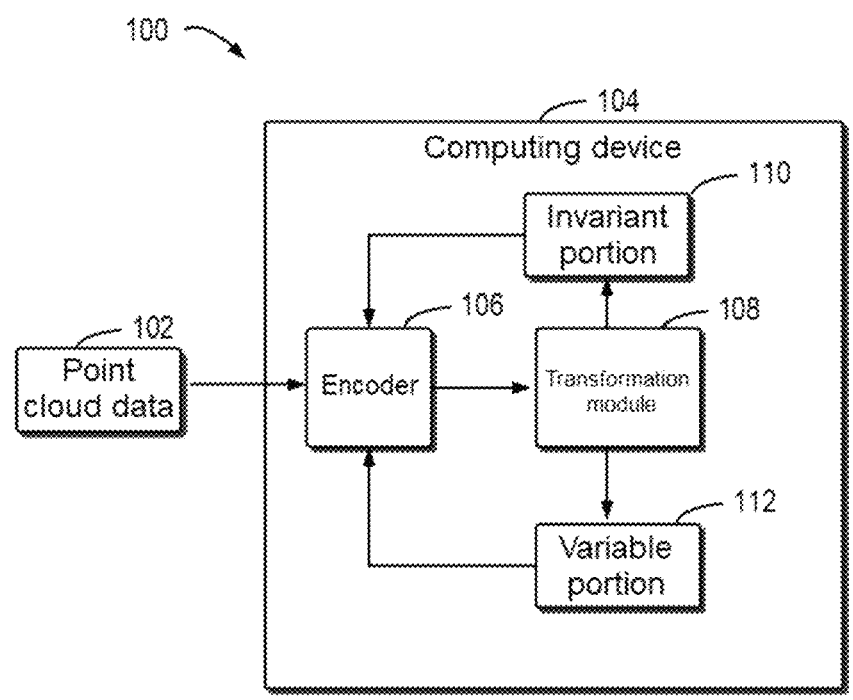
FIG. 1 illustrates a schematic diagram of an example environment in which devices and/or methods according to embodiments of the present disclosure can be implemented.

Embodiments of the present disclosure will be described in more detail below with reference to the accompanying drawings. Although the drawings show example embodiments of the present disclosure, it should be understood that the present disclosure can be implemented in various forms, and should not be explained as being limited to the embodiments described herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As described above, three-dimensional point cloud data includes much information specific to the object. A number of techniques have been used in conventional solutions to process the three-dimensional point cloud data for the analysis thereof. These methods suffer from many limitations. For example, the volumetric convolutional neural network (CNN) is an early solution to apply CNNs to process point cloud data. However, the volumetric representation is limited by its resolution due to data sparsity and the computational cost of three-dimensional convolution. Special methods have also been proposed to deal with sparsity problems. However, these operations are still focused on sparse volumes. It is a challenge for them to deal with very large point clouds. Moreover, this kind of processing is relatively time consuming and wastes a lot of resources, and is not user friendly.

To address at least the above and other potential problems, embodiments of the present disclosure provide a method for training an encoder and processing data. In the method, a computing device inputs sample point cloud data for an object to the encoder to obtain encoded data for the object. A plurality of invariant portions for the object and a plurality of variable portions for the object are determined by transforming the encoded data. The computing device determines, based on the plurality of invariant portions and the plurality of variable portions, a similarity loss and a spatial loss for the sample point cloud data. The computing device then adjusts, based on the similarity loss and the spatial loss, a parameter of the encoder to obtain a trained encoder. Further, the computing device may use the trained encoder to process the point cloud data. This method improves the efficiency of processing point cloud data, saves time and computational resources, and improves accuracy.

Embodiments of the present disclosure will be further described in detail below with reference to the accompanying drawings.

FIG. 1 is a schematic diagram of example environment 100 in which embodiments of the present disclosure can be implemented. As shown in FIG. 1, example environment 100 includes computing device 104. Computing device 104 is used to receive point cloud data 102 for processing.

Computing device 104 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Point cloud data 102 in example environment 100 includes point cloud data for a target object. This point cloud data 102 is for a rigid target object, such as for an aircraft or a human face, or may be for other suitable objects.

Point cloud data 102 is input to encoder 106 in computing device 104 to obtain encoded data. In some embodiments, encoder 106 is a neural network model. In some embodiments, encoder 106 is any suitable machine model for encoding the data. The above examples are intended to describe the present disclosure only and are not specific limitations to the present disclosure.

Encoder 106 then inputs the encoded data to transformation module 108. The transformation module 108 performs a matrix transformation on the encoded data to obtain invariant portion 110 for the target object and variable portion 112 for the target object.

In one example, if point cloud data for an aircraft is input, the invariant portion may correspond to the shape and size of the aircraft, while the variable portion may correspond to the coordinates or position information for various parts of the aircraft. This is because the shape of the aircraft is invariant in the point cloud data for the aircraft obtained from any angle, while its position may be different in different point cloud data. The above examples are intended to describe the present disclosure only and are not specific limitations to the present disclosure. In some embodiments, the input point cloud data is the point cloud data for a human face. Then, the invariant and variable portions of the human face are obtained. The invariant portion may be sizes of five sense organs of the human face, while the variable portion may be the expression. Variable portion 112 may be applied to other objects or avatars. For example, the expression may be combined with another avatar in an avatar pool to generate an avatar with a new expression. The above examples are intended to describe the present disclosure only and are not specific limitations to the present disclosure.

In some embodiments, when training encoder 106, point cloud data, as sample point cloud data, is input to the encoder 106 to obtain a vector representation of the object, which is then input to transformation module 108 for matrix transformation to obtain invariant portion 110 and variable portion 112. A similarity loss is then determined using invariant portion 110, and a spatial loss is determined using variable portion 112. These two losses are then combined to adjust the parameter of the encoder 106 to enable training.

In some embodiments, in addition to using the above losses, the invariant portion and the variable portion are input to a decoder to obtain reference point cloud data for the object, then a data loss between the reference point cloud data and the sample point cloud data is calculated, and then the parameters of the encoder and the decoder are adjusted with reference to the similarity loss, the spatial loss, and the data loss, so as to achieve simultaneous training of the encoder and the decoder.

This method improves the efficiency of processing point cloud data, saves time and computational resources, and improves accuracy.

Figure 2:
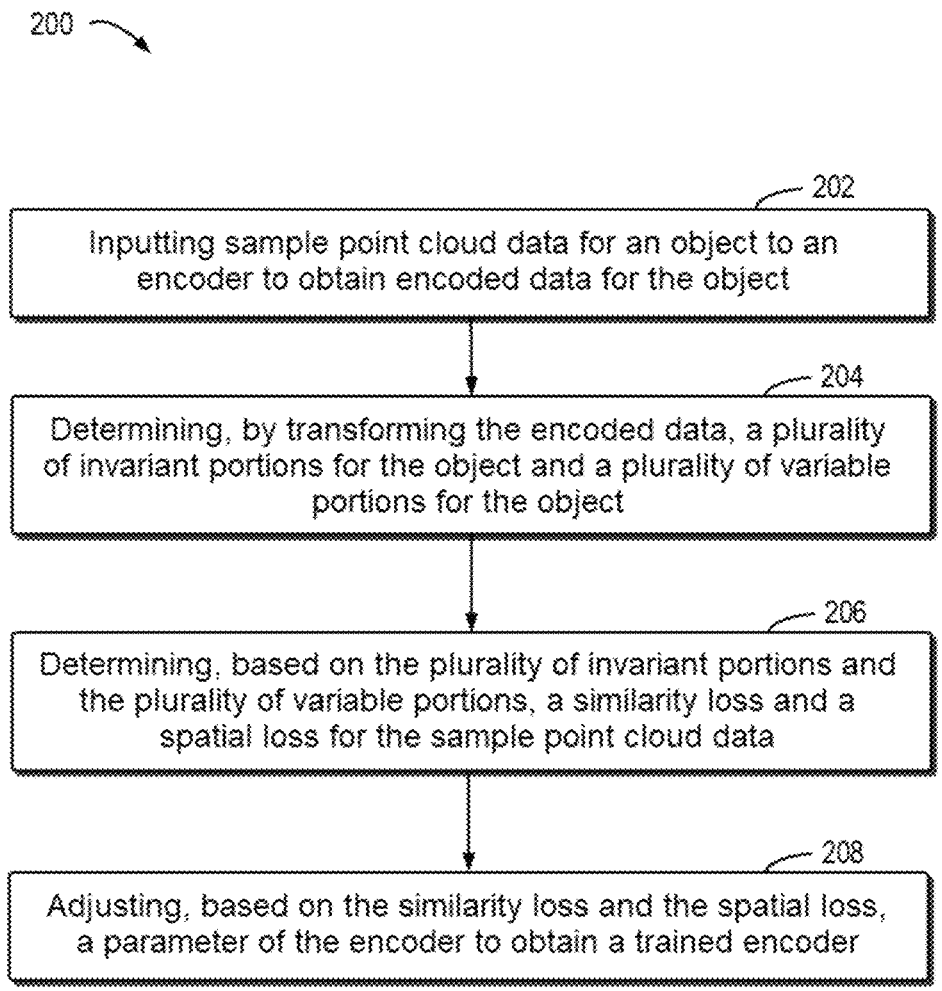
FIG. 2 illustrates a flow chart of a method for training an encoder according to an embodiment of the present disclosure.

A block diagram of example environment 100 in which embodiments of the present disclosure can be implemented has been described above with reference to FIG. 1. A flow chart of method 200 for training an encoder according to an embodiment of the present disclosure will be described below with reference to FIG. 2. Method 200 may be executed at computing device 104 in FIG. 1 and any suitable computing device.

At block 202, sample point cloud data for an object is input to an encoder to obtain encoded data for the object. For example, computing device 104 obtains point cloud data 102 as the sample point cloud data.

In some embodiments, point cloud data 102 may be represented by the following Equation (1):

$$P=\{P_n|n=1,\ldots,N\} \qquad (1)$$

where $P_n$ represents a vector representation of each point in the point cloud data, N is a positive integer which represents the number of points in the point cloud data, and $P_n$ may include their coordinates (x,y,z) and other feature information such as color, norm, etc.

At block 204, by transforming the encoded data, a plurality of invariant portions for the object and a plurality of variable portions for the object are determined, an invariant portion in the plurality of invariant portions indicating an invariant feature of the object and a variable portion in the plurality of variable portions indicating a variable feature of the object. For example, if the point cloud data is specific to an aircraft, the invariant portions may indicate the shape and size of the aircraft, and the variable portions may indicate the coordinates and locations of parts of the aircraft.

Figure 3:
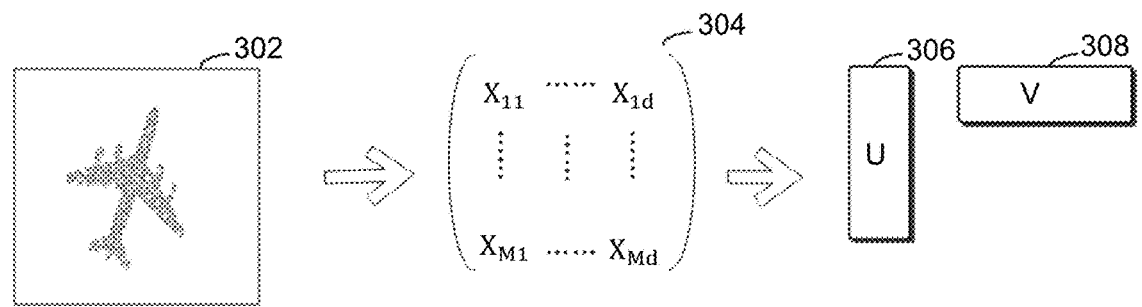
FIG. 3 illustrates a schematic diagram of an example of matrix decomposition according to an embodiment of the present disclosure.

In some embodiments, computing device 104 performs a matrix transformation on the encoded data to obtain the plurality of invariant portions and the plurality of variable portions. FIG. 3 illustrates a schematic diagram of example 300 of matrix decomposition according to an embodiment of the present disclosure. Feature vector X 304 is generated by the encoder from point cloud data 302 for the aircraft, is then subject to matrix decomposition, and is decomposed into variable portion U 306 and invariant portion V 308.

In some embodiments, the feature vector X may be represented by the following Equation (2):

$$X=UV+E \qquad (2)$$

where X denotes the feature matrix of the point cloud, V denotes an invariant portion for the object, which may be considered as a template factor that captures important information of the data set, such as the invariant portion of the object like its shape and size, and U denotes the variable portion of the object, which may be considered as an activation factor, such as the coordinates and positions of a point in different point cloud data, etc. $U \in R^{M \times k}$, and $V \in R^{k \times d}$, where M and d denote the dimensionality of the vector space, k is a decomposition factor, and k<d. Thus, a vector transformation may be performed on X to obtain U and V.

Returning to FIG. 2 for further description, at block 206, based on the plurality of invariant portions and the plurality of variable portions, a similarity loss and a spatial loss for the sample point cloud data are determined. For example, computing device 104 uses invariant portion 110 and variable portion 112 to obtain the similarity loss and the spatial loss.

In some embodiments, computing device 104 determines the similarity loss based on a first invariant portion and a second invariant portion in the plurality of invariant portions. Computing device 104 further determines the spatial loss based on a first variable portion and a second variable portion in the plurality of variable portions. By adopting the above approach, loss data can be quickly acquired.

In some embodiments, the similarity loss of the point cloud data for the object is calculated by the following Equation (3):

$$L_{sim}=\|V_1-V_2\|_F \qquad (3)$$

where $\|\ \|_F$ denotes an F norm, and $V_1$ and $V_2$ are invariant portions obtained for two pieces of the point cloud data for the object.

In some embodiments, the spatial loss of the point cloud data for the object is calculated by the following Equation (4):

$$L_{spa}(P)=tr(U^T W U) \qquad (4)$$

where tr( ) denotes a trace of the matrix, where U is a variable portion of the feature vector, and W is a weight matrix of the 3D point cloud set, where W(m,n) is a weight between two points m and n, and where W(m,n) is calculated by the following Equation (5):

$$W(m,n) = \exp\left(\frac{\|P_m - P_n\|_2^2}{\sigma^2}\right) \qquad (5)$$

where σ denotes a parameter of control distance, exp( ) denotes an exponential function, Pm and Pn denote vector representations of points m and n in the point cloud, respectively, and where $\|\ \|_2^2$ denotes a square of the 2 norm.

In some embodiments, after obtaining a plurality of invariant portions for the object and a plurality of variable portions for the object, the invariant portions and corresponding variable portions may be input to the decoder to obtain the reference point cloud data for the object. The decoder may be a neural network model or any suitable machine model. For example, the first invariant portion and the first variable portion are input to the decoder to obtain the reference point cloud data for the object. The data loss between the reference point cloud data and the sample point cloud data is then determined. At this point, in combination with the decoder, the encoder and the decoder may be trained as a whole. The data loss of the decoder is represented by the following Equation (6):

$$L_{dec} = \frac{1}{N}\|P - \hat{P}\|_F \qquad (6)$$

where $\hat{P}$ is an output matrix of the decoder, N is the number of points in the point cloud, and $\|\ \|_F$ denotes an F norm. The above examples are intended to describe the present disclosure only and are not further limitations to the present disclosure.

At block 208, a parameter of the encoder is adjusted based on the similarity loss and the spatial loss to obtain a trained encoder. For example, computing device 104 uses the similarity loss and the spatial loss to adjust encoder 106.

In some embodiments, computing device 104 combines the similarity loss and the spatial loss to obtain a combined loss. Computing device 104 then determines whether the combined loss is greater than a first threshold loss.

If it is determined that the combined loss is greater than the first threshold loss, the computing device adjusts the parameter of the encoder. If the combined loss is less than or equal to the first threshold loss, the parameter of the encoder is no longer adjusted, at which point the training ends.

In some embodiments, computing device 104 may separately determine whether the similarity loss and the spatial loss are both less than corresponding threshold losses. If the similarity loss and the spatial loss are both less than the corresponding threshold losses, the parameter of the encoder is no longer adjusted. Otherwise, the parameter of the encoder continues to be adjusted.

In some embodiments, as mentioned above, the encoder is also trained together with the decoder. In this case, computing device 104 adjusts the parameter of the encoder and the parameter of the decoder based on the similarity loss, the spatial loss, and the data loss. In some embodiments, the computing device combines the similarity loss, the spatial loss, and the data loss to obtain a total loss. It is then determined whether the total loss is greater than a second threshold loss. If it is determined that the total loss is greater than the second threshold loss, the parameter of the encoder and the parameter of the decoder are adjusted. If it is determined that the total loss is less than or equal to the second threshold loss, training is stopped.

For example, when the encoder and decoder are trained together, the total loss thereof is shown in the following Equation (7):

$$L = L_{sim} + \alpha \Sigma_{i=1}^{2} L_{spa}^{i} + \beta \Sigma_{i=1}^{2} L_{dec}^{i} \qquad (7)$$

where $\alpha$ and $\beta$ denote the weights for controlling the loss function.

In some embodiments, when the encoder and decoder are trained together, the similarity loss, the spatial loss, and the data loss may be compared with their corresponding threshold losses, respectively. If the similarity loss, the spatial loss, and the data loss are all less than the corresponding threshold losses, training is stopped. If the above condition is not met, the parameters of the encoder and decoder continue to be adjusted. The above examples are intended to describe the present disclosure only and are not specific limitations to the present disclosure. The person skilled in the art can set any suitable way to adjust the parameters of the encoder and/or decoder using the obtained losses as needed.

This method improves the efficiency of processing point cloud data, saves time and computational resources, and improves accuracy.

The method for training the encoder is described above in conjunction with FIGS. 2 and 3, and an example process for training the encoder and decoder is described below in conjunction with FIGS. 4 and 5.

Figure 4:
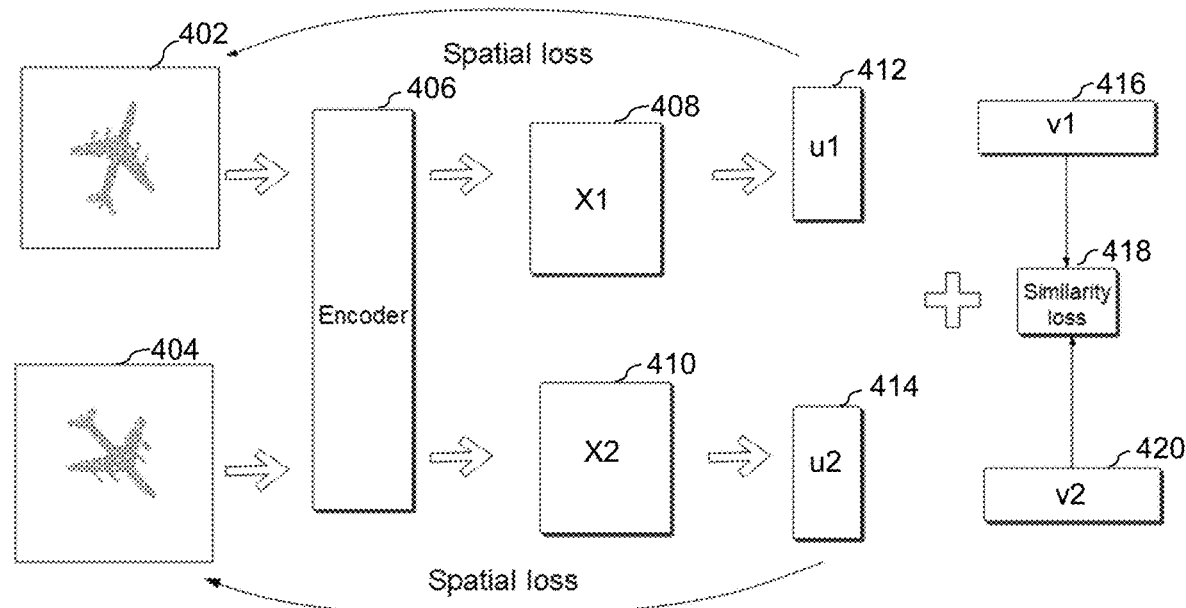
FIG. 4 illustrates a schematic diagram of an example process for training an encoder according to an embodiment of the present disclosure.

FIG. 4 illustrates a schematic diagram of example process 400 for training an encoder. As shown in FIG. 4, two pieces of point cloud data 402 and 404 are input to encoder 406 to obtain two corresponding feature vectors: feature vector X1 408 and feature vector X2 410, which are then transformed to obtain corresponding variable portion u1 412 and invariant portion v1 416, and variable portion u2 414 and invariant portion v2 420. Similarity loss 418 is then calculated using v1 and v2, and the spatial loss is calculated using u1 and u2, so that the encoder can be adjusted using the similarity loss and the spatial loss.

Figure 5:
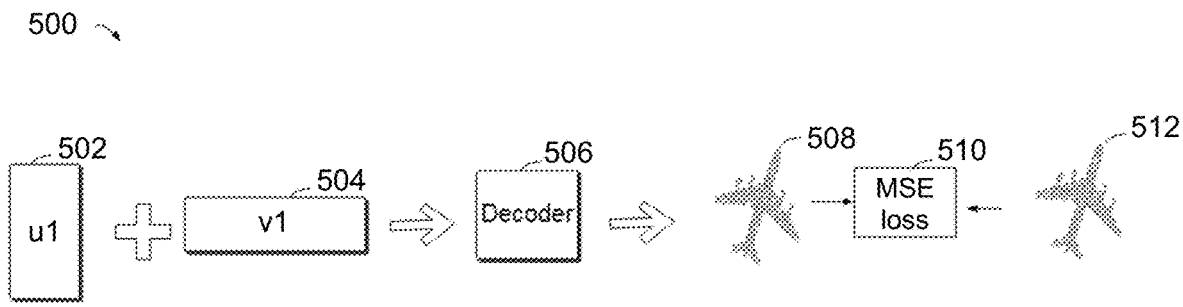
FIG. 5 illustrates a schematic diagram of an example of using a decoder according to an embodiment of the present disclosure.

FIG. 5 further illustrates a schematic diagram of example 500 of using the decoder and encoder together for training.

As shown in FIG. 5, after variable portion u1 502 and invariant portion v1 504 are obtained, they are input to decoder 506. Decoder 506 is then used to generate reference point cloud data 508, and then the data error, e.g., the mean square error (MSE) loss 510, is calculated for reference point cloud data 508 and sample point cloud data 512. The parameters of the encoder and the decoder are then adjusted using the similarity loss, the spatial loss, and the data error together. The above examples are for describing the present disclosure only and are not intended to be a specific limitation of the present disclosure.

Figure 6:
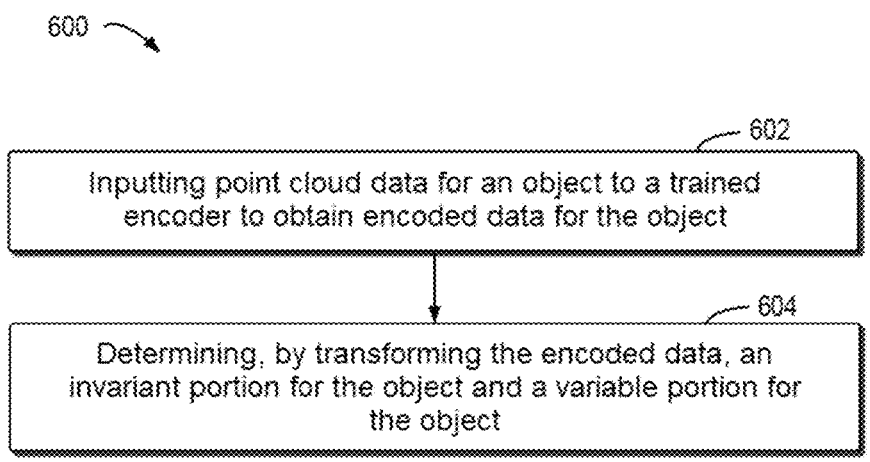
FIG. 6 illustrates a flow chart of a method for processing data according to an embodiment of the present disclosure.

A flow chart of method 600 for processing data according to an embodiment of the present disclosure is described below in conjunction with FIG. 6, which depicts the application of an encoder.

At block 602, point cloud data for an object is input to a trained encoder to obtain encoded data for the object, the trained encoder being obtained by adjusting a parameter of an encoder based on a similarity loss and a spatial loss obtained for sample point cloud data for a sample object. For example, computing device 104 will encode, using the trained encoder 106, the point cloud data of the to-be-processed object.

At block 604, by transforming the encoded data, an invariant portion for the object and a variable portion for the object are determined, the invariant portion indicating an invariant feature of the object and the variable portion indicating a variable feature of the object. For example, computing device 104 performs a matrix transformation on the encoded data to obtain the invariant portion and the variable portion.

In some embodiments, computing device 104 may apply the variable portion for the object to other objects.

Figure 7:
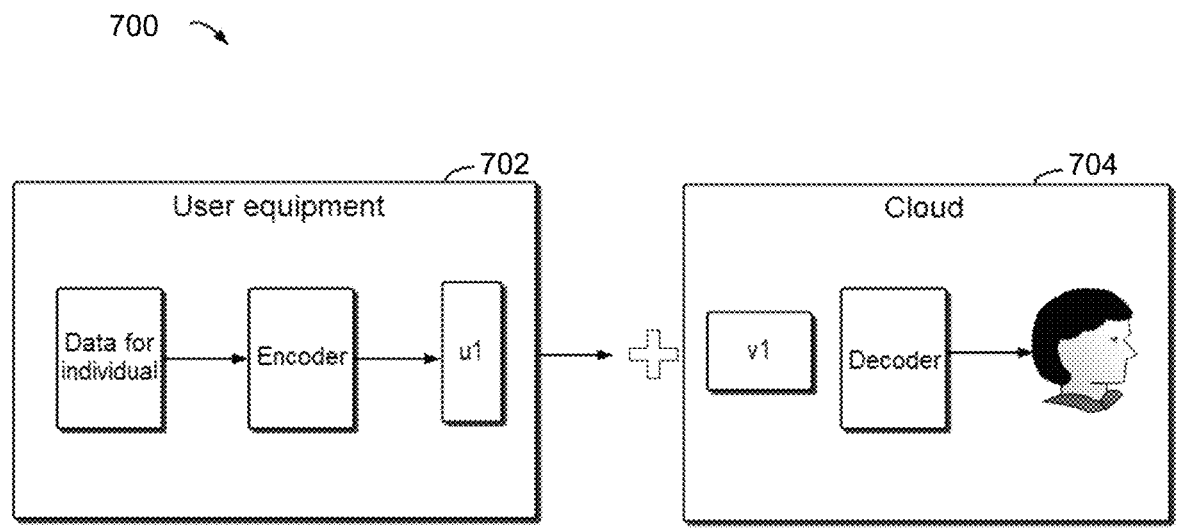
FIG. 7 illustrates a schematic diagram of an example of application of data according to an embodiment of the present disclosure.

FIG. 7 illustrates a schematic diagram of example 700 of application of data. As shown in FIG. 7, variable portion u1 for an individual is obtained at user equipment 702 after processing the point cloud data for the individual using the trained encoded data. Then, u1 is sent to cloud 704 so as to be applied to the decoder in combination with invariant portion v1 of an avatar, and then the avatar including the variable content of the individual is obtained. The above examples are intended to describe the present disclosure only and are not specific limitations to the present disclosure.

This method improves the efficiency of processing point cloud data, saves time and computational resources, and improves accuracy.

Figure 8:
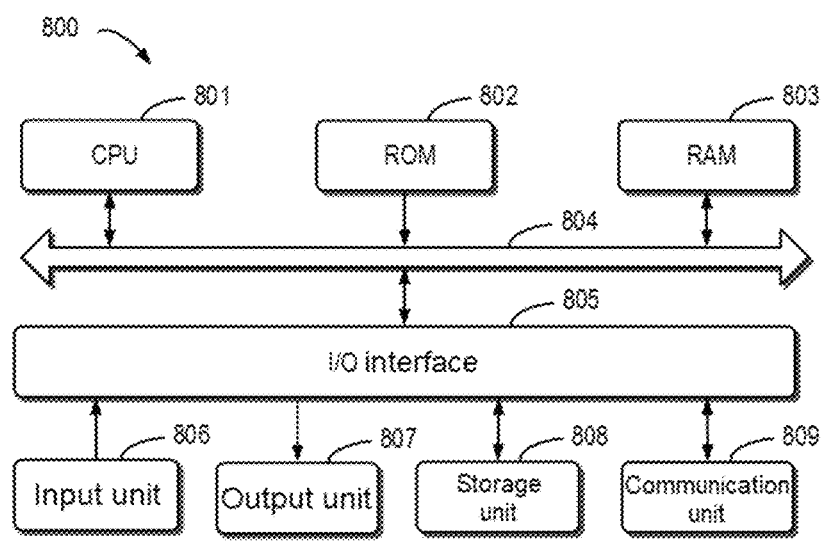
FIG. 8 illustrates a schematic block diagram of an example device suitable for implementing embodiments of the present disclosure.

FIG. 8 is a schematic block diagram of example device 800 that can be used to implement an embodiment of the present disclosure. Computing device 104 in FIG. 1 may be implemented using device 800. As shown in the figure, device 800 includes central processing unit (CPU) 801, which may execute various appropriate actions and processing according to computer program instructions stored in read-only memory (ROM) 802 or computer program instructions loaded from storage unit 808 onto random access memory (RAM) 803. Various programs and data required for the operation of device 800 may also be stored in RAM 803. CPU 801, ROM 802, and RAM 803 are connected to each other through bus 804. Input/Output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

The various processes and processing described above, for example, methods 200 and 600, can be performed by CPU 801. For example, in some embodiments, method 200 and/or method 600 may be implemented as a computer software program that is tangibly included in a machine-readable medium, such as storage unit 808. In some embodiments, part or all of the computer program may be loaded and/or installed onto device 800 via ROM 802 and/or communication unit 809. When the computer program is loaded into RAM 803 and executed by CPU 801, one or more actions of methods 200 and 600 described above may be performed.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method comprising:
   inputting sample point cloud data for an object to an encoder to obtain encoded data for the object;
   determining, by transforming the encoded data, a plurality of invariant portions for the object and a plurality of variable portions for the object, an invariant portion in the plurality of invariant portions indicating an invariant feature of the object and a variable portion in the plurality of variable portions indicating a variable feature of the object;
   determining, based on the plurality of invariant portions and the plurality of variable portions, a similarity loss and a spatial loss for the sample point cloud data; and
   adjusting, based on the similarity loss and the spatial loss, a parameter of the encoder to obtain a trained encoder.

2. The method according to claim 1, wherein determining the invariant portion and the variable portion comprises:
   performing a matrix transformation on the encoded data to obtain the plurality of invariant portions and the plurality of variable portions.

3. The method according to claim 1, wherein determining the similarity loss and the spatial loss comprises:
   determining the similarity loss based on a first invariant portion and a second invariant portion in the plurality of invariant portions; and
   determining the spatial loss based on a first variable portion and a second variable portion in the plurality of variable portions.

4. The method according to claim 3, further comprising:
   inputting the first invariant portion and the first variable portion to a decoder to obtain reference point cloud data for the object; and
   determining a data loss between the reference point cloud data and the sample point cloud data.

5. The method according to claim 4, wherein adjusting the parameter of the encoder comprises:
   adjusting the parameter of the encoder and a parameter of the decoder based on the similarity loss, the spatial loss, and the data loss.

6. The method according to claim 5, wherein adjusting the parameter of the encoder and a parameter of the decoder based on the similarity loss, the spatial loss, and the data loss comprises:
   combining the similarity loss, the spatial loss, and the data loss to obtain a total loss; and
   adjusting the parameter of the encoder and the parameter of the decoder if determining that the total loss is greater than a second threshold loss.

7. The method according to claim 1, wherein adjusting the parameter of the encoder comprises:
   combining the similarity loss and the spatial loss to obtain a combined loss; and
   adjusting the parameter of the encoder if determining that the combined loss is greater than a first threshold loss.

8. A computer program product tangibly stored on a non-transitory computer-readable medium and including machine-executable instructions, wherein the machine-executable instructions, when executed by a machine, cause the machine to perform the method of claim 1.

9. A method for processing data, comprising:
   inputting point cloud data for an object to a trained encoder to obtain encoded data for the object, the trained encoder being obtained by adjusting a parameter of an encoder based on a similarity loss and a spatial loss obtained for sample point cloud data for a sample object; and
   determining, by transforming the encoded data, an invariant portion for the object and a variable portion for the object, the invariant portion indicating an invariant feature of the object and the variable portion indicating a variable feature of the object.

10. The method according to claim 9, wherein determining the invariant portion and the variable portion comprises:
    performing a matrix transformation on the encoded data to obtain the invariant portion and the variable portion.

11. The method according to claim 9, further comprising:
    applying the variable portion for the object to other objects.

12. An electronic device, comprising:
    at least one processor; and
    a memory coupled to the at least one processor and having instructions stored thereon, wherein the instructions, when executed by the at least one processor, cause the device to perform actions comprising:
    inputting sample point cloud data for an object to an encoder to obtain encoded data for the object;
    determining, by transforming the encoded data, a plurality of invariant portions for the object and a plurality of variable portions for the object, an invariant portion in the plurality of invariant portions indicating an invariant feature of the object and a variable portion in the plurality of variable portions indicating a variable feature of the object;
    determining, based on the plurality of invariant portions and the plurality of variable portions, a similarity loss and a spatial loss for the sample point cloud data; and
    adjusting, based on the similarity loss and the spatial loss, a parameter of the encoder to obtain a trained encoder.

13. The electronic device according to claim 12, wherein determining the invariant portion and the variable portion comprises:
    performing a matrix transformation on the encoded data to obtain the plurality of invariant portions and the plurality of variable portions.

14. The electronic device according to claim 12, wherein determining the similarity loss and the spatial loss comprises:
  determining the similarity loss based on a first invariant portion and a second invariant portion in the plurality of invariant portions; and
  determining the spatial loss based on a first variable portion and a second variable portion in the plurality of variable portions.

15. The electronic device according to claim 14, wherein the actions further comprise:
  inputting the first invariant portion and the first variable portion to a decoder to obtain reference point cloud data for the object; and
  determining a data loss between the reference point cloud data and the sample point cloud data.

16. The electronic device according to claim 15, wherein adjusting the parameter of the encoder comprises:
  adjusting the parameter of the encoder and a parameter of the decoder based on the similarity loss, the spatial loss, and the data loss.

17. The electronic device according to claim 16, wherein adjusting the parameter of the encoder and a parameter of the decoder based on the similarity loss, the spatial loss, and the data loss comprises:
  combining the similarity loss, the spatial loss, and the data loss to obtain a total loss; and
  adjusting the parameter of the encoder and the parameter of the decoder if determining that the total loss is greater than a second threshold loss.

18. The electronic device according to claim 12, wherein adjusting the parameter of the encoder comprises:
  combining the similarity loss and the spatial loss to obtain a combined loss; and
  adjusting the parameter of the encoder if determining that the combined loss is greater than a first threshold loss.

19. The electronic device according to claim 12, wherein the instructions, when executed by the at least one processor, further cause the device to perform actions comprising:
  inputting point cloud data for an object to the trained encoder to obtain encoded data for the object; and
  determining, by transforming the encoded data, an invariant portion for the object and a variable portion for the object, the invariant portion indicating an invariant feature of the object and the variable portion indicating a variable feature of the object.

20. The electronic device according to claim 19, wherein determining the invariant portion and the variable portion comprises:
  performing a matrix transformation on the encoded data to obtain the invariant portion and the variable portion.

* * * * *